United States Patent [19]

Long

[11] 4,215,596
[45] Aug. 5, 1980

[54] GEAR SHIFT LEVER ASSEMBLY HAVING IGNITION SYSTEM DEENERGIZING MEANS

[76] Inventor: Leonard C. Long, R.D. No. 2, Annville, Pa. 17003

[21] Appl. No.: 970,670

[22] Filed: Dec. 18, 1978

[51] Int. Cl.³ .............................................. B60K 41/08
[52] U.S. Cl. ..................................................... 74/851
[58] Field of Search ........................... 74/850, 851, 852

[56] References Cited

U.S. PATENT DOCUMENTS

| | | | |
|---|---|---|---|
| 2,247,164 | 6/1941 | Butzbach | 74/851 |
| 2,373,259 | 4/1945 | Price | 74/851 |
| 2,387,891 | 10/1945 | Elkin | 74/851 |
| 2,387,911 | 10/1945 | Kearney | 74/852 |
| 2,534,769 | 12/1950 | Hart | 318/675 |
| 2,591,080 | 8/1950 | Simpson | 134/139 |
| 2,741,350 | 4/1956 | Dodge | 74/851 |
| 3,235,741 | 2/1966 | Plaisance | 250/229 |
| 3,304,433 | 2/1967 | Hamann | 250/227 |
| 3,481,223 | 12/1969 | Fraser | 74/851 |
| 3,598,933 | 8/1971 | Walser | 200/11 |
| 3,663,822 | 5/1972 | Uchida | 250/217 S |
| 3,792,630 | 2/1974 | Hause | 74/860 |
| 4,028,959 | 6/1977 | Long | 74/473 R |

*Primary Examiner*—C. J. Husar
*Assistant Examiner*—Conrad Berman
*Attorney, Agent, or Firm*—Fritz Raring

[57] ABSTRACT

Vehicle gear shifting lever assembly comprises a lever having a knob on the end thereof. The knob is pivotally mounted on the lever for relative movement in the to and fro directions of movement of the gear shift lever. Signal generating means are provided on portions of the knob and on the lever which produce a signal when the knob is moved relative to the lever. The knob is releasably coupled to the lever by a coupling means which releases upon application of a force which is less than the force required to move the lever when changing gears. When gears are changed, the knob first moves relative to the lever and the lever is then moved. The signal generated by the signal generating means is used to deenergize the ignition system of the vehicle so that the clutch need not be depressed during gear changing.

14 Claims, 8 Drawing Figures

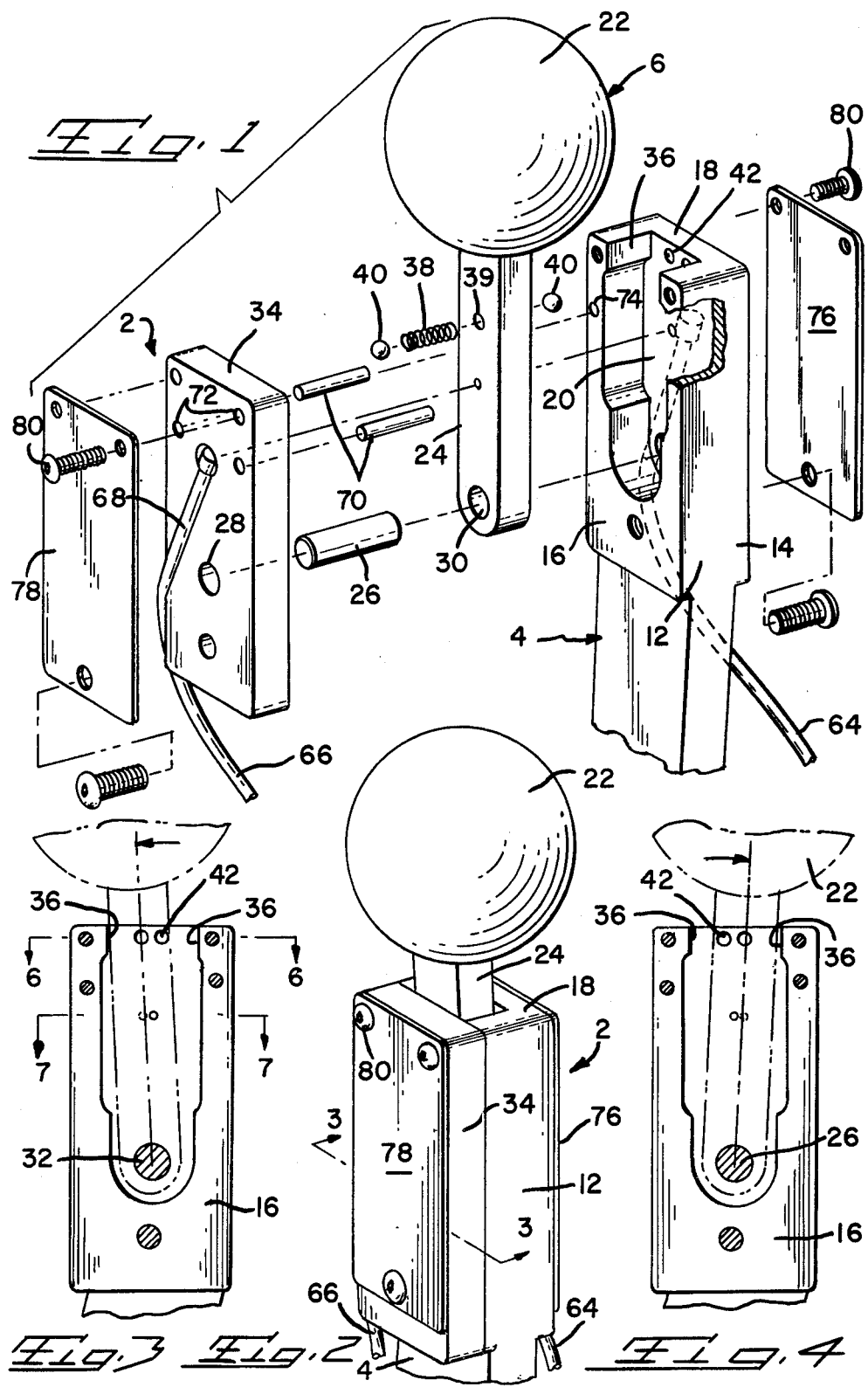

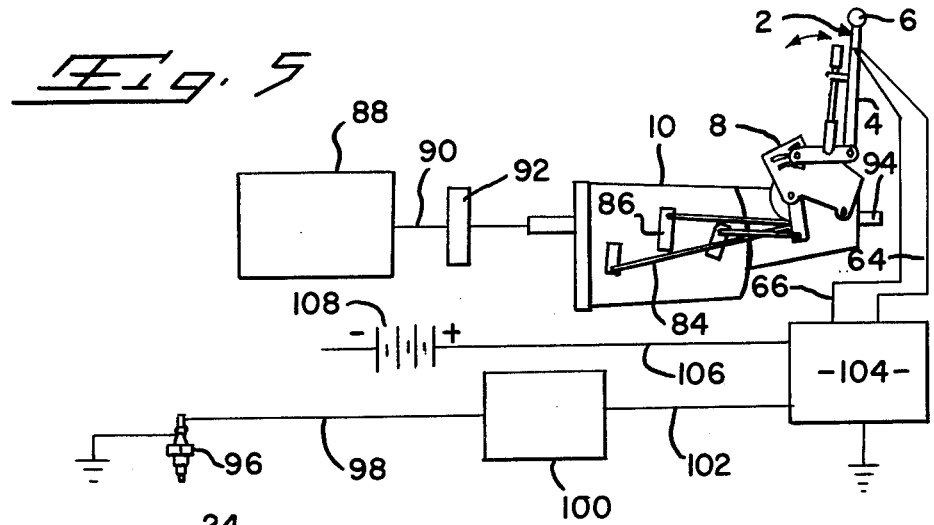
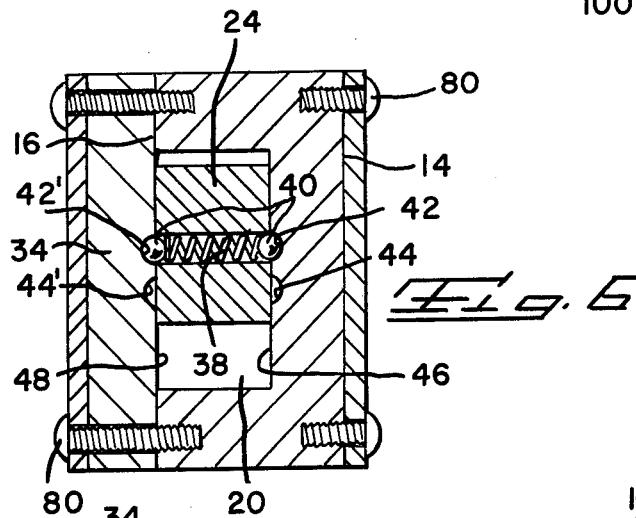
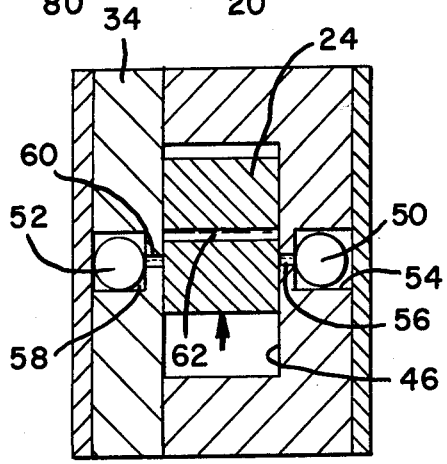
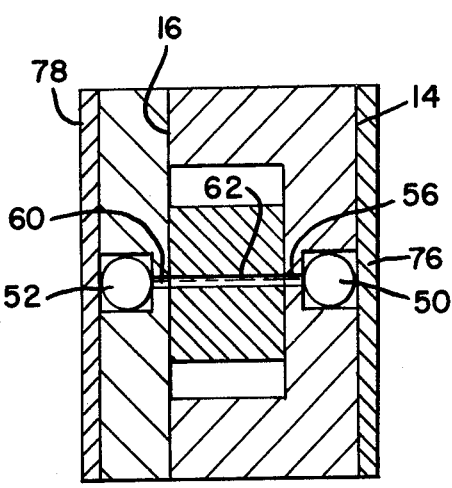

GEAR SHIFT LEVER ASSEMBLY HAVING IGNITION SYSTEM DEENERGIZING MEANS

FIELD OF THE INVENTION

This invention relates to gear shifting means for vehicles having associated therewith means for deenergizing the ignition system of the vehicle during shifting in order to permit shifting without de-clutching. The embodiment of the invention described below is particularly intended for use on drag racing machines however, the principles of the invention can be used under other driving conditions. Known shifting means having ignition deenergizing devices associated therewith are shown in U.S. Pat. Nos. 2,247,164, 2,387,891, 3,792,630, and 2,591,080.

BACKGROUND OF THE INVENTION

Drag racing is a type of vehicle competition in which the vehicle is driven over a relatively short course, usually one-fourth of a mile, from rest, the object being to cover the course in the shortest possible time. Drag racing machines are highly specialized having highly tuned engines which rotate at speeds in excess of 9,000 revolutions per minute and are equipped with many specialized components such as transmissions, shifting mechanisms and suspension systems. It is common for a good machine in the hands of a skilled driver to cover the course of one-fourth of a mile in less than ten seconds and to achieve speeds in excess of 160 miles per hour.

Drag racing vehicles are usually equipped with four or five speed manual transmissions and it is common for a skilled driver to take the machine through three gear changes during the first four seconds of a heat. Thus at the end of four seconds, the driver may shift from third to fourth gear in the vehicle while it is traveling at a speed of about 130 miles per hour and the engine is rotating at a speed of 9,000 RPM. Most drag race drivers change gears in the usual manner, that is by de-clutching, moving the gear shift lever, and reengaging the clutch. These operations require about 0.15 seconds when carried out by a skilled driver and during this interval, the engine of a vehicle will not be transmitting torque to the drive shaft. Also, during changing, the driver maintains engine speed with the accelerator and sometimes has difficulty getting the vehicle into the next gear because of racing of the engine beyond the speed he desires.

It has long been recognized that gears can be changed without de-clutching with some transmissions and by the exercise of a high degree of skill on the part of the driver. One type of transmission produced by Doug Nash Equipment and Engineering Corporation, 36,360 Ecorse Road, Romulus, Michigan which is used to drag racing can theoretically be changed without de-clutching but there is a serious danger of damaging the transmission if this is done and most drivers prefer to de-clutch during shifting. It has also been recognized that gear changing is facilitated if the ignition system is de-energized and it has been suggested that gears could be changed in drag racing competition if the ignition system could be deenergized during the shifting operation. The prior U.S. Patents noted above disclose several types of mechanisms for deenergizing the ignition system during gear changing such as switches which are opened when the gear shift lever is moved. These prior art devices may be satisfactory for some driving conditions but they would be totally unsuited for the extreme conditions which exist in drag racing competition. The extremely high speeds achieved and the acceleration which the machines undergo causes considerable vibration which in turn would interfere with conventional mechanical switches on, or associated with, the gear shift lever. The risks of malfunction with such devices are so great that drivers do not choose to take the chance of using such devices for fear of failure which of course would prevent them from finishing a heat. The present invention is directed to the achievement of a gear shift lever having signal generating means therein which is positive in its action, completely reliable, and which can be used by the driver without distraction during a gear changing operation.

A preferred embodiment of the invention comprises a gear shift lever having a knob or handle on its end, the knob having an arm extending therefrom which is received in a recess in the upper end of the lever. The arm is pivoted in a manner which permits the arm and knob to move relative to the lever in the to and fro directions of movement of the gear shift lever when gear ratios are changed. The arm and knob are coupled to the gear shift lever when in their forward or rearward positions by means of detents which are releasable upon application of a force to the knob which is less than the force required to move the lever and shift gears. Thus, when the driver pushes or pulls the knob, he first moves the knob and arm relative to the lever and then he moves the lever to the position of the gear he is shifting into. The signal generating means is provided in the form of a light bulb and light detector in the lever. Light from the bulb is blocked from impinging on the detector when the arm and knob are in either of their extreme positions however, when they are moved from one position to the other light is permitted to impinge on the detector by virtue of a small hole in the arm. The detector produces a pulse or signal which is transmitted to a control circuit forming part of the ignition system of the vehicle. The control circuit in turn deenergizes the ignition system for a very brief interval while the gear lever is being moved. As a result, gears are changed under very low torque or no torque conditions and the driver need not de-clutch.

DESCRIPTION OF THE DRAWINGS

FIG. 1 is a perspective view of a gear shifting lever assembly in accordance with the invention with the parts exploded from each other.

FIG. 2 is a perspective view showing the parts assembled. FIG. 3 is a sectional side view showing the knob part of the assembly in its forward position, this view being taken along the lines 3—3 of FIG. 2.

FIG. 4 is a view similar to FIG. 3 but showing the knob part in its rearward position.

FIG. 5 is a semi-diagrammatic view showing portions of the drive train and the ignition system of a vehicle.

FIGS. 6 and 7 are views taken along the lines 6—6 and 7—7 of FIG. 3.

FIG. 8 is a view similar to FIG. 7 but showing the position of the shift knob arm at an intermediate stage of movement of the knob from its forward to its retracted position.

DISCLOSED EMBODIMENT

A gear shifting lever assembly 2 in accordance with the invention comprises a shifting lever part 4 having a knob or handle part 6 on its upper end. The lever extends from a shifting mechanism 8 which is associated with a transmission or gear box 10 described below.

The lever 4 has an enlarged upper end 12, this upper end having right hand and left hand (as viewed in the drawing) side surfaces 14, 16 respectively and an upper end surface 18. A recess 20 extends into the surface 18 and opens onto the side surface 16. The knob 22 has an integral arm 24 which is received in recess 20 and is pivoted at its lower end, by means of pivot pin 26, to the lever. The pin 26 extends through an opening 30 in the arm 24 and is received in an opening 28 in a side plate 34 and in the right hand portion, as viewed in the drawing, of the lever. The knob 22 and the arm 24 can thus be moved between the two positions shown in FIGS. 3 and 4 relative to the lever 4. The side surfaces 36 of the recess 20 serve as stops and prevent movement of the arm 24 beyond the positions shown.

Knob 22 and arm 24 are releasably coupled in the extreme positions of FIGS. 3 and 4 to the lever by first and second detent means comprising recesses 42, 42' in the surface 46 of the lever and in the surface 48 of the plate 34 and recesses 44, 44' in the same surfaces. The detent means further comprises a coil spring 38 contained in a hole 39 in arm 24 and ball bearings 40 which are contained between the side surfaces of the arm 24 and the surfaces 46, 48. It will be apparent that when the arm 24 is moved towards the recesses 44, 44' from its position shown in FIG. 6, the ball bearings 40 will be cammed inwardly with accompanying compression of the spring 38 until they can enter the recesses 44, 44'. For reasons which will be explained below, the stiffness of spring 38 should be such that these ball bearings will be cammed inwardly under the influence of a force on the knob 22 which is less than the force required to move the lever 4 during gear changing.

The signal generating means is provided to produce a signal in the form of a pulse when the knob 22 and arm 24 are moved relative to the lever between the forward and rearward positions shown in FIGS. 3 and 4. This signal generating means comprises a incandescent lamp 50 mounted in a recess 54 in the side surface 14 of the lever. A small hole 56 extends from the inner end of recess 54 to the surface 46 so that light can pass through this hole to a similar hole 60 in the side plate 34. The hole 60 extends to a recess 58 in side plate 34 in which a photo electric sensor or detector 52 is mounted.

It will be seen from FIG. 7 that when the arm 24 and the knob are in their forward positions (FIG. 3) the light path from the bulb 50 to the detector 52 is blocked by the arm 24 however, during movement of the arm and knob to the retracted positions (FIG. 4) the hole 62 in the arm moves into alignment with the holes 56, 60 so that light from the bulb 50 is received by the detector 52. When the arm 24 reaches the position of FIG. 4, the light path is again blocked by the arm.

The light bulb 50 and the detector 52 have cables 64 and 66 extending therefrom which are preferably shielded to prevent pick-up of foreign signals. The cable 66 is positioned in a half round recess 68 in the leftwardly facing surface of the plate 34 and extends to a control circuit means 104. Cable 64 is positioned in a similar recess in the side surface 14 of the lever and also extends to the control circuit means.

The side plate 34 is precisely positioned on the enlarged upper end 12 of the lever 4 and against the surface 16 by locating pins 70 which extend into openings 72 in plate 34 and openings 74 in the upper end of the lever on each side of the recess 20. Suitable cover plates 76, 78 are mounted against the side surface 14 of the lever and against the outwardly facing surface of plate 34 and are held in position by fasteners 80.

Turning now to FIG. 5, the previously identified shifting mechanism 8 may be of a general type described in my previously issued U.S. Pat. No. 4,028,959. This type of shifting mechanism requires only forward and rearward motion of the gear shift lever 4 during shifting and does not require lateral movement as with a conventional H-pattern shifter. However, the present invention can also be used with H-pattern shifters. The shifting mechanism 8 has a plurality of actuating levers therein which are coupled by means of rods 84 to control rods 86 extending from the side of the gear box 10. Movement of the lever 4 actuates one of the rods 84 and thereby moves one of the control members 86 to change gears in the gear box.

FIG. 5 further shows the engine 88 coupled by means of a shaft and clutch 90, 92 to the gear box, the output shaft of the gear box being shown at 94. The ignition system components shown include the battery 108, a conductor 106 which extends from the battery to the control circuit means 104 and a conductor 102 which extends from the control circuit means 104 to a distributor or solid state ignition system 100. Conductors 98 extend from the distributor to the spark plugs as shown at 96.

As is apparent from FIG. 5, power is ordinarily supplied to the distributor through the control circuit means 104 and then to the spark plugs. The control circuit means however contain circuitry described below which, upon receipt of a signal from the detector 52, interrupts flow of current through the conductor 102 for a very short predetermined interval. After the elapse of the required time interval, current again is passed through the conductor 102 to the distributor or solid state ignition means 100.

It has been determined from tests that if the control circuit means is adjusted to deenergize the ignition system for about 0.02 seconds, the interval will be sufficient for the driver to shift the lever 4 and change gears in the vehicle. Since the spark plugs are not firing during this interval, no torque, or very little torque, is being transmitted to the gear box 10 and the driver can change gears without de-clutching. The significance of the invention to racing drivers can be appreciated as it is noted that an interval of 0.02 seconds for gear changing involves only a loss of about three revolutions of the engine of the vehicle. In other words, the engine is not available during this extremely brief period for accelerating the vehicle to a higher speed. By contrast and as noted above, if the driver de-clutches to change gears, about 0.15 seconds are required and about twenty-five revolutions of the engine will be lost for purposes of the race. As an alternative to a timed interval of ignition deenergization, the circuit control means 104 can be arranged to count pulses of the engine or of the distributor and interrupt the wiring of the spark plugs 96 for a predetermined number of pulses. However, the timed interruption has been tested and been found to be quite satisfactory.

The circuit control means may comprise a main transistor through which the current normally flows to the distributor 100 and a mono-stable multi vibrator which is triggered by the pulse and which is effective to turn off transistor for the predetermined interval of about 0.02 seconds. The interval can be varied by means of a suitable resistance-capacitance network which is capable of adjustment.

A variety of signal generating systems can be used in the practice of the invention and in conjunction with the pivoted knob or handle releasably coupled to the gear shift lever. For example, two light sources and two detectors positioned at the detent positions or extreme positions of the arm might be used and the circuit arranged such that the ignition system is deenergized when light is not received by one of the detectors. Also, as an alternative to the use of an incandescent lamp as a source of radiant energy, a light emitting diode could be used for improved reliability. An infrared source and detector can be used and might prove advantageous in that the detector would be totally insensitive to ordinary light. However good results have been obtained with a small incandescent lamp as described above.

It will be apparent from the foregoing that when a driver shifts gears, he applies the force required to move the lever but before the lever moves, the knob moves from one position to another and immediately thereafter the lever begins to move. The driver thus instinctively performs the operation, movement of the knob relative to the lever, which is required to deenergize the system.

As previously mentioned the principles of the invention can be employed for driving in rallies other than drag races. For example, rally driving requiring frequent gear shifts or over-the-road driving. The use of the invention will result in prolonged clutch life since the clutch is used only when the vehicle is started or stopped.

I claim:

1. A vehicle gear shifting lever assembly having signal generating means therein for generating a signal when said lever assembly is moved in to and fro directions during gear changing, said signal being usable to deenergize the ignition system of a vehicle during gear changing, said shifting lever assembly comprising:
    a shifting lever part and a knob part, mounting means serving to mount said knob on one end of said lever, said mounting means permitting limited movement of said knob relative to said lever in the to and fro directions of movement of said lever
    signal generating means in said lever and in said knob, said signal generating means being effective to produce a signal when said knob is moved relative to said lever, and
    overload release coupling means serving releasably to couple said knob to said lever, said coupling means being releasable upon application of a predetermined force to said knob which is less than the force required to move said lever in said to and fro directions whereby,
upon application of a force in excess of said predetermined force to said knob, said knob is moved relative to said lever thereby to produce a signal prior to movement of said lever, said signal being usable to deenergize the ignition system of the vehicle during movement of said lever with accompanying gear changing.

2. A gear shifting lever assembly as set forth in claim 1, said mounting means comprising a pivotal connection between said knob and said lever, said pivotal connection having a pivot axis extending normally of said to and fro directions.

3. A gear shifting liver assembly as set forth in claim 2, said overload release coupling means comprising detent means.

4. A gear shifting lever assembly as set forth in claim 1, said signal generating means comprising a radiant energy detector and a radiant energy source, said detector and said source being mounted in one of said parts of said assembly with said detector being spaced from, and positioned to receive energy from, said source, said other part of said assembly having blocking portions which are between said detector and said source, said blocking portions of said other part having an opening therein which permits passage of radiant energy when said knob is moved relative to said lever whereby passage and non-passage of said radiant energy produces said signal.

5. A gear shifting lever assembly as set forth in claim 4, said source and said detector being in said lever part; said blocking portions being integral with said knob part.

6. A vehicle gear shifting lever assembly having signal generating means therein for generating a signal when said lever assembly is moved in to and fro directions during gear changing, said signal being usable to deenergize the ignition system of a vehicle during gear changing, said lever assembly comprising:
    a shift lever part having a knob part on the free end thereof, an arm extending from said knob and overlapping portions of said lever, said arm being pivotally connected to said lever on a pivot axis which extends transversely of said to and fro directions whereby said arm and knob are movable relative to said lever in said to and fro directions,
    front and rear stop means limiting movement of said knob, said knob being in front and rear positions when said knob is in engagement with said front and rear stop means respectively,
    signal generating means for producing a signal when said knob is moved between said front and rear positions, said signal generating means comprising radiant energy source means and radiant energy detector means, said source means and detector means being in spaced-apart relationship in one of said parts, the other of said parts having blocking portions which are between said source means and said detector means when said knob is in either of said positions and which prevents energy from said source from reaching said detector, said blocking portions having an opening therein which permits energy to reach said detector when said knob is moved between said positions whereby,
upon movement of said knob from one of said positions to the other position, a signal is produced by said detector which is usable to deenergize the ignition system of a vehicle.

7. A gear shifting lever assembly as set forth in the claim 6, said radiant energy source means and said radiant energy detector means comprising respectively a signal radiant energy source and a single radiant energy detector.

8. A gear shifting lever assembly as set forth in claim 7, said radiant energy source comprising an incandescent lamp.

9. A gear shifting lever assembly as set forth in claim 6, said radiant energy source means and said detector means being in said lever, said blocking portions comprising said arm on said knob.

10. A gear shifting lever assembly as set forth in claim 6 having first and second detent means for releasably coupling said arm to said lever adjacent to said front and rear stops respectively, each of said detent means being releasable upon application of a force to said knob which is less than the force required to move said lever in said to and fro directions.

11. A gear shifting lever assembly as set forth in claim 10, said arm having an end which is remote from said knob, said arm being pivotally connected to said lever adjacent to said end, said detent means being between said knob and said end of said arm.

12. A vehicle gear shifting lever assembly having signal generating means therein for generating a signal when said lever assembly is moved in to and fro directions during gear changing, said signal being usable to deenergize the ignition system of a vehicle during gear changing, said lever assembly comprising:

a shift lever having a free end and having an opening extending into said lever from said free end, a shifting knob having an integral arm extending therefrom, said arm extending into said opening and having an end which is proximate to the inner end of said opening, said arm being pivotally connected to said lever at said end of said arm on a pivot axis which extends transversely of said to and fro directions whereby said knob and said arm can be moved in said to and fro directions relative to said lever, first and second detent means for releasably coupling said arm to said lever when said arm and knob are in front and rear positions relative to said lever respectively, said detent means being releasable upon application of a force to said knob which is less than the force required to move said lever in said to and fro directions, and signal generating means in said arm and lever, said signal generating means being effective to produce a signal when said knob and arm are moved relative to said lever in said to and fro directions whereby, said signal is usable to deenergize the ignition system of a vehicle during movement of said lever with accompanying gear changing.

13. A vehicle gear shifting assembly as set forth in claim 12, said signal generating means comprising radiant energy source means and radiant energy detector means.

14. A vehicle gear shifting assembly as set forth in claim 13, said radiant energy source and detector means comprising a single source and detector, said source and detector being mounted in said shift lever on opposite sides thereof.

* * * * *